(12) United States Patent
Ellin et al.

(10) Patent No.: US 10,982,334 B2
(45) Date of Patent: Apr. 20, 2021

(54) SUBSTRATE TREATMENT DEVICE AND METHOD AND ENCODER SCALE TREATED BY THIS METHOD

(75) Inventors: Alexander David Scott Ellin, Gloucestershire (GB); James Reynolds Henshaw, Gloucestershire (GB); David Roberts McMurtry, Gloucestershire (GB)

(73) Assignee: RENISHAW PLC, Wotton-under-Edge (GB)

( * ) Notice: Subject to any disclaimer, the term of this patent is extended or adjusted under 35 U.S.C. 154(b) by 1147 days.

(21) Appl. No.: 12/659,404

(22) Filed: Mar. 8, 2010

(65) Prior Publication Data
US 2010/0163536 A1    Jul. 1, 2010

Related U.S. Application Data

(63) Continuation of application No. 10/494,732, filed as application No. PCT/GB02/05179 on Nov. 15, 2002, now Pat. No. 7,723,639.

(30) Foreign Application Priority Data
Nov. 15, 2001    (GB) .................................. 0127410.9

(51) Int. Cl.
*B23K 26/00* (2014.01)
*C03C 15/00* (2006.01)
*C23F 1/02* (2006.01)
*B23K 26/04* (2014.01)
*B23K 26/08* (2014.01)
(Continued)

(52) U.S. Cl.
CPC ................ *C23F 1/02* (2013.01); *B23K 26/04* (2013.01); *B23K 26/0823* (2013.01); *B23K 26/361* (2015.10); *G01D 5/34707* (2013.01)

(58) Field of Classification Search
CPC .. B23K 26/04; B23K 26/0823; B23K 26/361; C23F 1/02; G01D 5/34707
USPC ............ 219/121.61, 121.69, 121.68, 121.67, 219/121.85; 216/65
See application file for complete search history.

(56) References Cited

U.S. PATENT DOCUMENTS

| 3,573,007 | A | | 3/1971 | Grobitz |
| 3,747,117 | A | * | 7/1973 | Fechter .......................... 347/224 |
| 3,959,819 | A | * | 5/1976 | Kubo .......................... 360/73.03 |

(Continued)

FOREIGN PATENT DOCUMENTS

| DE | 30 42 650 | 11/1980 |
| DE | 196 08 937 | 9/1996 |

(Continued)

OTHER PUBLICATIONS

Dec. 26, 2008 Office Action for Japanese Patent Application No. 2003-561816 (with translation).

(Continued)

*Primary Examiner* — Sang Y Paik
(74) *Attorney, Agent, or Firm* — Oliff PLC (57) ABSTRACT

The invention provides a substrate treatment method and apparatus. Embodiments show a substrate in the form of a rotary encoder ring having a pattern of marks producable by means of a laser treatment device controllable to produce the pattern in the correct manner while there is continuous relative displacement between the ring and the laser treatment device.

20 Claims, 5 Drawing Sheets

(51) Int. Cl.
  *G01D 5/347* (2006.01)
  *B23K 26/361* (2014.01)

(56) References Cited

U.S. PATENT DOCUMENTS

| | | | | |
|---|---|---|---|---|
| 4,406,939 | A | * | 9/1983 | Golker .................. 219/121.69 |
| 4,486,794 | A | * | 12/1984 | Itoh ............................ 360/70 |
| 4,547,649 | A | * | 10/1985 | Butt et al. ............. 219/121.66 |
| 4,636,043 | A | * | 1/1987 | Bellar ...................... 359/210.1 |
| 4,652,528 | A | * | 3/1987 | Domkowski ................ 436/56 |
| 4,775,608 | A | * | 10/1988 | Baum et al. ................ 430/320 |
| 4,846,552 | A | * | 7/1989 | Veldkamp et al. .......... 359/572 |
| 4,883,710 | A | * | 11/1989 | Machida .................... 428/336 |
| 4,932,131 | A | | 6/1990 | McMurtry et al. |
| 5,040,159 | A | * | 8/1991 | Oliver et al. ............. 369/30.34 |
| 5,053,618 | A | | 10/1991 | McElroy |
| 5,120,927 | A | * | 6/1992 | Williams et al. ....... 219/121.68 |
| 5,397,686 | A | * | 3/1995 | Dominick et al. ........... 430/346 |
| 5,463,200 | A | * | 10/1995 | James et al. ........... 219/121.68 |
| 5,521,802 | A | * | 5/1996 | Edington .................. 362/155 |
| 5,630,979 | A | | 5/1997 | Welz et al. |
| 5,632,916 | A | * | 5/1997 | Lappalainen et al. ... 219/121.85 |
| 5,650,249 | A | | 7/1997 | Dull et al. |
| 5,736,709 | A | | 4/1998 | Neiheisel |
| 5,822,211 | A | * | 10/1998 | Barenboim et al. ......... 700/166 |
| 6,031,201 | A | * | 2/2000 | Amako et al. .......... 219/121.68 |
| 6,066,830 | A | | 5/2000 | Cline et al. |
| 6,113,704 | A | * | 9/2000 | Satoh et al. ................ 118/728 |
| 6,156,030 | A | | 12/2000 | Neev |
| 6,159,832 | A | | 12/2000 | Mayer |
| 6,160,568 | A | | 12/2000 | Brodsky et al. |
| 6,423,935 | B1 | | 7/2002 | Hackel et al. |
| 6,433,303 | B1 | | 8/2002 | Liu et al. |
| 6,451,421 | B1 | | 9/2002 | Robertson et al. |
| 6,455,163 | B1 | | 9/2002 | Okamoto et al. |
| 6,501,068 | B1 | | 12/2002 | Eisenhauer |
| 6,518,540 | B1 | * | 2/2003 | Wee et al. ............... 219/121.61 |
| 6,613,087 | B1 | | 9/2003 | Healy et al. |
| 6,621,040 | B1 | * | 9/2003 | Perry .................... A61B 18/20 |
| | | | | 219/121.67 |
| 6,627,468 | B2 | * | 9/2003 | Chiba ........................ 438/24 |
| 6,703,582 | B2 | | 3/2004 | Smart et al. |
| 6,776,340 | B2 | | 8/2004 | Murokh et al. |
| 6,930,842 | B2 | | 8/2005 | Shibazaki |
| 7,088,650 | B1 | | 8/2006 | Worthington et al. |
| 2002/0135667 | A1 | | 9/2002 | Sakakibara et al. |
| 2003/0015672 | A1 | | 1/2003 | Gallagher |
| 2004/0094728 | A1 | | 5/2004 | Herzog et al. |
| 2005/0045586 | A1 | | 3/2005 | Ellin et al. |

FOREIGN PATENT DOCUMENTS

| | | |
|---|---|---|
| EP | 0 380 810 A2 | 8/1990 |
| EP | 0 420 667 A2 | 4/1991 |
| EP | 1 145 797 A2 | 10/2001 |
| EP | 1 145 797 A3 | 10/2002 |
| JP | A-5-169286 | 7/1983 |
| JP | A-60-31369 | 2/1985 |
| JP | A-1-109319 | 4/1989 |
| JP | A-4-033784 | 2/1992 |
| JP | U-3009367 | 4/1995 |
| JP | A-9-085475 | 3/1997 |
| JP | A-5-99694 | 4/2005 |
| WO | WO 99/20427 | 4/1999 |

OTHER PUBLICATIONS

Apr. 25, 2008 Office Action for Japanese Patent Application No. 2003-561816 (with translation).
Translation dated Dec. 8, 2005 Office Action for European Patent Application No. 03701588.0-2302.
Apr. 28, 2006 Office Action for U.S. Appl. No. 10/500,716.
Nov. 16, 2006 Office Action for U.S. Appl. No. 10/500,716.
Sep. 26, 2007 Office Action for U.S. Appl. No. 10/500,716.
Mar. 13, 2008 Office Action for U.S. Appl. No. 10/500,716.
Nov. 21, 2008 Office Action for U.S. Appl. No. 10/500,716.
Sep. 17, 2003 International Search Report for PCT/GB 03/00266.
Apr. 13, 2017 Office Action issued in U.S. Appl. No. 14/696,842.
Sep. 21, 2017 Office Action Issued in U.S. Appl. No. 14/696,842.
May 17, 2018 Office Action issued in U.S. Appl. No. 14/696,842.
Dec. 27, 2018 Office Action issued in U.S. Appl. No. 14/696,842.

\* cited by examiner

SUBSTRATE TREATMENT DEVICE AND METHOD AND ENCODER SCALE TREATED BY THIS METHOD

This is a Continuation of application Ser. No. 10/494,372 filed May 6, 2004, which claims the benefit of British Patent Application No. 0127410.9 filed Nov. 15, 2001. The disclosures of the prior applications are hereby incorporated by reference herein in their entirety.

This invention relates to the production of a pattern by means of treating a substrate for example using laser light. In particular, but not exclusively, the invention relates to producing encoder scales for example rotary encoders for use in measurement devices which employ an encoder scale reader.

Using a laser to mark a substrate with a periodic pattern is known, one example being described in U.S. Pat. No. 4,406,939 (assigned to Siemens). The Siemens patent shows three different methods of producing a rotary encoder scale. In one method (illustrated in FIG. 2 of that patent) a clock pulse generator is used to control the firing of a laser to mark an encoder disk. This disk may be rotated by a motor whose speed is derived from the same clock pulses. The motor may be a stepper motor.

One disadvantage of that proposed system is a lack of accuracy. The motor must be driven at an exact angular speed and therefore must be of exceptional quality. There is no explanation of how to produce the line marking illustrated when the disk is continuously moving transverse to that line or, if scanning is employed, how the laser 8 returns to its line start position when rotation is continuous.

Other methods of encoder scale production, e.g. as described also in U.S. Pat. No. 4,406,939 involve the step-wise movement of the scale and its treatment by a laser. The techniques discussed appear to suffer from the disadvantage of heat build-up at the lased area and the consequent change in local dimension which will affect accuracy. Additionally, known techniques suffer from inaccuracy brought about by the need for accurate incremental movement of the scale or laser.

The present invention provides a method of treating a substrate to produce a pattern thereat comprising the following steps in any suitable order:
  providing a substrate;
  providing a substrate treatment device;
  providing a control system;
  providing a displacement mechanism which provides a displacement signal indicative of displacement;
  operating the displacement mechanism so as to cause continuous relative displacement between the substrate and the treatment device;
  operating the control system so as to monitor that displacement signal and cause the treatment device to treat the substrate at intervals so as to produce the pattern whilst the continuous displacement takes place, wherein; the control system is further operated so as to perform a timing comparison step for synchronising the displacement signal and the said intervals.
Preferably the following steps are provided also:
generating a reference signal for controlling the intervals;
further operating the control system so as to monitor the reference signal, and;
further operating the control system so that the timing comparison step occurs for synchronising the displacement signal with the reference signal.
Preferably the said further step of operating the control system so that the timing comparison step occurs for synchronising the displacement signal with the reference signal includes, if necessary, increasing or decreasing the rate at which the displacement signal occurs by increasing or decreasing the relative displacement.

Alternatively the said further step of operating the control system so that the timing comparison step occurs for synchronising the displacement signal with the reference signal includes, if necessary, increasing or decreasing the rate at which the reference signal occurs thereby increasing or decreasing the rate of the intervals.
  Preferably the method further provides the step of:
    providing a phased lock loop circuit as part of the control system, wherein the monitoring and timing comparison of the displacement and reference signals takes place within the phased lock loop circuit.

Preferably the said relative displacement is angular motion about an axis, the said pattern is formable about that axis and;
  the intervals occur at a rate F calculated by the equation $F=R \times L/S$ where R is the angular motion in revolutions per unit time, L is the number of repetitions of the pattern required in a complete revolution, and S is an integer value which is not a factor of L.

Preferably the displacement mechanism provides an angular motion inducing torque of such inconsequence, and has a moment of inertia of sufficient magnitude, as to inhibit any rapid change in velocity of the continuous relative displacement.

Preferably the phased lock loop circuit is formed as a control loop and the control loop has a bandwidth which is below the rotation frequency R thereby suppressing any cyclic errors present in the displacement signal.

Preferably the pattern to be produced at the substrate is formed from elements, each element being created by treating the substrate at more than one interval and all the elements receiving their first treatment before any receive their second treatment.

Preferably the said substrate treatment device includes a laser light source and means for directing a beam of the laser light toward the substrate;
  the said treating of the substrate includes directing the laser light toward the substrate;
  and the said intervals of treating include pulses of the light directed toward the substrate.

Preferably the pattern to be produced at the substrate is formed from elements, the elements being selected from a group consisting of:
  equispaced and periodically occurring elements;
  equispaced and periodically occurring elements having elements missing;
  spaced elements conforming to an irregular pattern;
  spaced elements conforming to an irregular pattern having elements missing;
  randomly occurring elements.

Preferably the said relative displacement or angular motion is effected by causing the substrate to rotate whilst the treatment device remains substantially stationary.

The invention provides also a method of treating a substrate with laser light to produce a generally periodic pattern thereat comprising the following steps in any suitable order:
  generating a reference signal;
  displacing the substrate in a direction of movement relative to the laser light by use of a displacement mechanism;
  providing a motion signal indicative of that displacement;
  monitoring the motion and reference signals;

maintaining the velocity of the displacement so as to keep the motion and reference signals substantially in synchronism, and;

treating the substrate by means of directing pulses of the laser light at the substrate at a rate determined by the reference signal so as to produce the pattern.

The invention provides also apparatus for treating a substrate to produce a pattern thereat comprising:

a substrate treatment device;

a mechanism for causing continuous relative displacement of the treatment device relative to the substrate;

a displacement signal generator, and;

a control system operable so as to monitor the displacement signal and operable so as to cause the treatment device to treat the substrate at intervals for producing the pattern whilst the continuous displacement takes place, wherein;

the control system is further operable to perform a timing comparison step for synchronising the displacement signal and the intervals.

Preferably the apparatus also comprises:

a reference signal generator for causing the treatment intervals, and wherein;

the timing comparison step is performed to keep the displacement and reference signals substantially in synchronism.

Preferably the control system includes a phased lock loop circuit and the monitoring and comparison of the displacement and reference signals takes place within the phased lock loop circuit.

The invention extends also to an encoder scale for use with measurement devices which employ a scale reader, the encoder scale including a substrate having a pattern thereat produced by a method as claimed in any one of the preceding claims 1 to 11.

Various embodiments of the invention will now be described with reference to the drawings in which.

Figure 1:
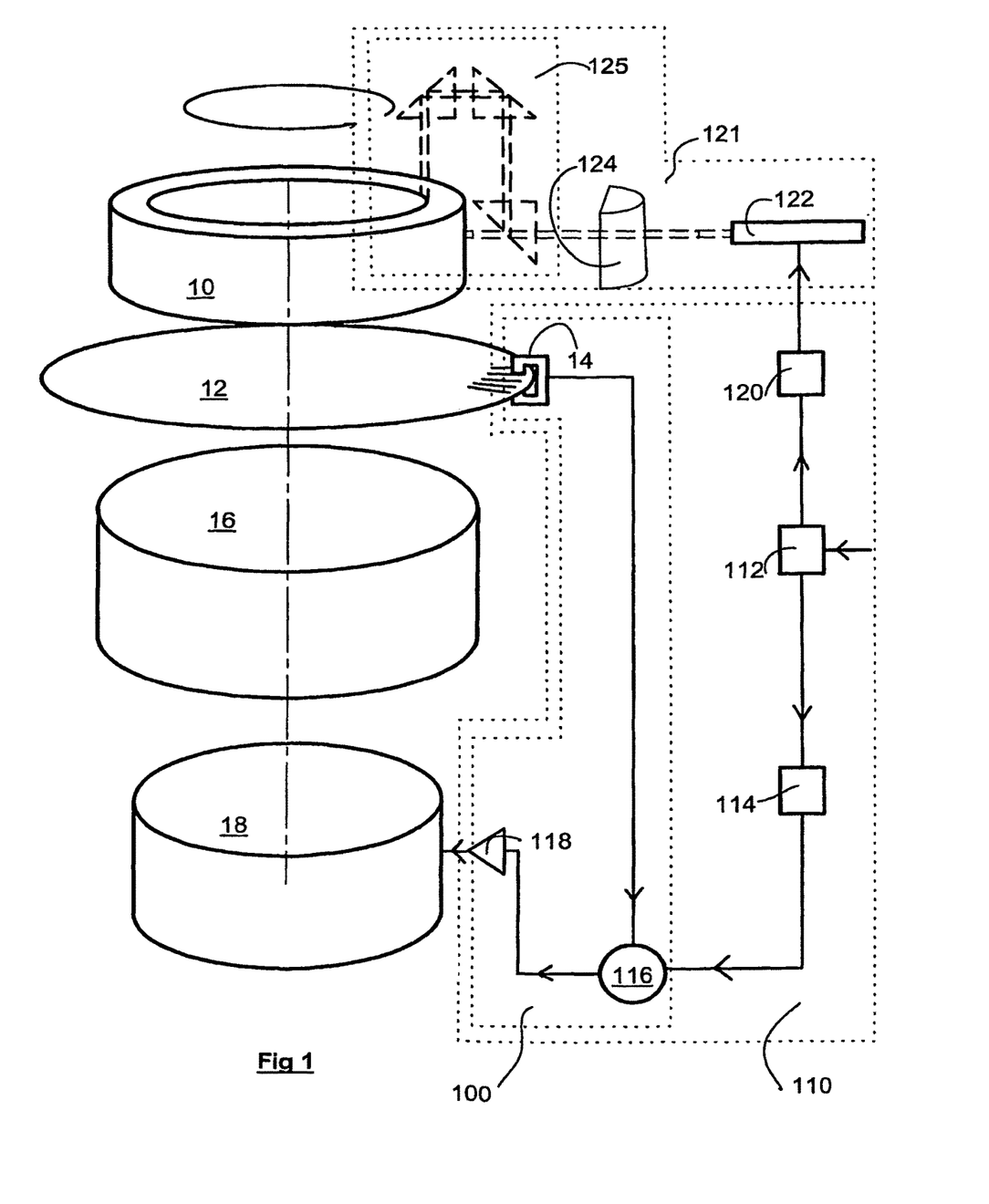
FIG. 1 shows an encoder scale production apparatus utilising the invention.

FIG. 1 shows a diagram of apparatus for the production of an encoder ring 10. In this apparatus there is shown a substrate in the form of a ring 10, a tachometer ring 12, tachometer sensor 14, a motor 18, and notionally, an inertial mass 16 (which may be incorporated in any of the other rotating parts). The ring 10 and tachometer ring 12 rotate together with some inertial mass 16 (supported by an air bearing) and all driven continually by a displacement mechanism including a motor 18. The speed of the rotating parts is kept constant (at 1000 rpm in this example but a speed between 100 and 3000 rpm has been found to work satisfactorily also) over a long period of time, by a control system 110. The system comprises a reference signal generator 112, a frequency divider 114, a phase locked loop (PLL) circuit 100 consisting of a tachometer sensor 14, a phase comparator 116 and a low band width filter 118 which drives the motor 18. The motor 18 is a d.c. brushless motor although other motors may alternatively be used and in operation the motor is powered at a current which is derived from the PLL circuit. The PLL circuit attempts to synchronise the phase of the signal from the tachometer sensor 14 with the phase of the reference signal from frequency divider 114 which originates from signal generator 112, and to adjust the current of the motor accordingly to bring the rotational speed of the ring 10 into conformity with the reference signal. Since there is inertia in the rotational elements, to the extent that the motor has the torque to accelerate the inertia only slowly, over several tens or hundreds of revolutions, then any change in speed will be gradual and thereby the rotational speed of the ring will be kept reasonably constant in the short and long term, i.e. a few hundred to a few thousand revolutions. Given the slow response time for the PLL correcting circuit, it does not matter if the motor is an inexpensive type or that the tachometer does not produce precise signals.

A substrate treatment device 121 will now be described. In this embodiment the treatment is laser ablation and the substrate is the surface of encoder ring 10.

A Ti sapphire laser 122 is shown which produces a beam of light having a short pulse period of a picosecond or below, with an energy of approximately 0.1 to 5 mJ/pulse. The timing of the pulse is governed by the reference signal also and another frequency divider 120.

A single cylindrical lens 124 or alternatively a system of lenses may be used to produce a stretched elliptical focused spot of the required profile e.g. having a major axis of approximately 6 mm and a minor axis of approximately 10 μm. The minor axis is aligned with the direction of rotation R.

With these parameters ablation will take place, and the more repetitions of the pattern are made on the ring the deeper will become the pattern. A pattern depth of approximately 0.1 to 0.5 μm can be produced by several firings of the laser at any one area, which may be carried out by repeat firings of the laser over many successive revolutions of the ring. A deeper or shallower pattern is possible.

It will be apparent that if a narrow spot (of 10 μm say) is used then a pattern having a wider pitch (of 40 μm say) will only be obtained by two or more adjacent pulses and a gap of two or more pulses in width. So by inhibiting, or altering the phasing of the pulses relative to the displacement it is possible to produce a pattern which is coarser pitch or has an uneven or non-uniform mark space ratio.

In practice the laser is fired, not at every successive incremental point of the required pattern, but at some integer S of increments which is not a factor of the total number of increments required around the circumference (in this instance) of the ring 10. This means that a pattern will be built-up over a number of revolutions of the ring 10, not all at once, so localised heating will be reduced and errors spread round the ring.

If the intention is to produce a ring with L evenly spaced lines W long, then to prevent heat build-up the laser treatment should not be at adjacent lines but spaced around the ring by S lines, where S is not a factor of L. The speed of rotation R of the ring must be $SF \div L$ revs per second where F is the laser pulse repetition rate in Hertz.

The higher the value of S for a given ring size, the faster the ring will spin and hence the greater its stability of rotation velocity R.

In an alternative construction the laser light may be directed at the ring from above as shown in the chain-dotted variant 125 in FIG. 1. In such an instance radial lines will be produced which are of equal merit to the axial lines produced by the preferred laser positioning. Lines on the inner circumference are also possible. The lines produced to not need to be precisely radially or axially aligned and may, if necessary, be skewed.

In an additional alternative construction the laser light is focused into an elliptical spot whose major axis is shorter than the required pattern, the extra length being achieved by moving the spot along the axis of rotation using a scanning mirror or prism or by moving the focusing lens or lenses relative to the ring.

For encoder rings of sufficiently large cross-section, the effects of laser induced heating of the substrate become less significant. The selection of a suitable laser can, for these rings, be widened to include any laser capable of generating the desired feature characteristics and whose pulse length is chosen to optimise the interaction with the substrate and minimise the spreading caused by the speed of displacement. This pulse length in practice is unlikely to be above 100 ns. Above this figure, the line produced typically becomes widened by the distance the ring circumference moves during the duration of the pulse.

Figure 2:
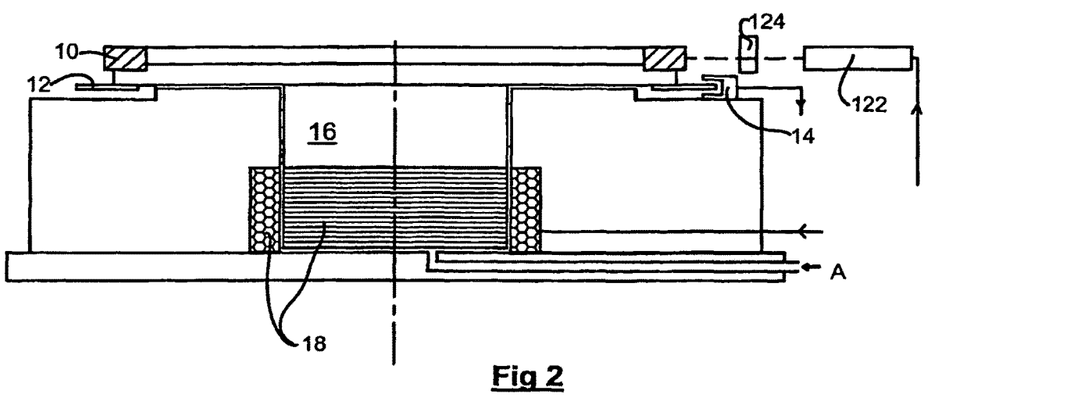
FIG. 2 shows a detail of one of the elements of the apparatus illustrated in FIG. 1.

In FIG. 2 one embodiment of the encoder ring production apparatus is shown in detail. Its control system is as described above. Motor 18 is of a d.c. brushless type and its rotor is incorporated into a central support 16. The support has an air bearing supplied at A. The ring is mounted atop the support 16 and rotated whilst laser 122 is pulsed at a rate matching the speed of the ring according to the equations mentioned above.

Figure 3:
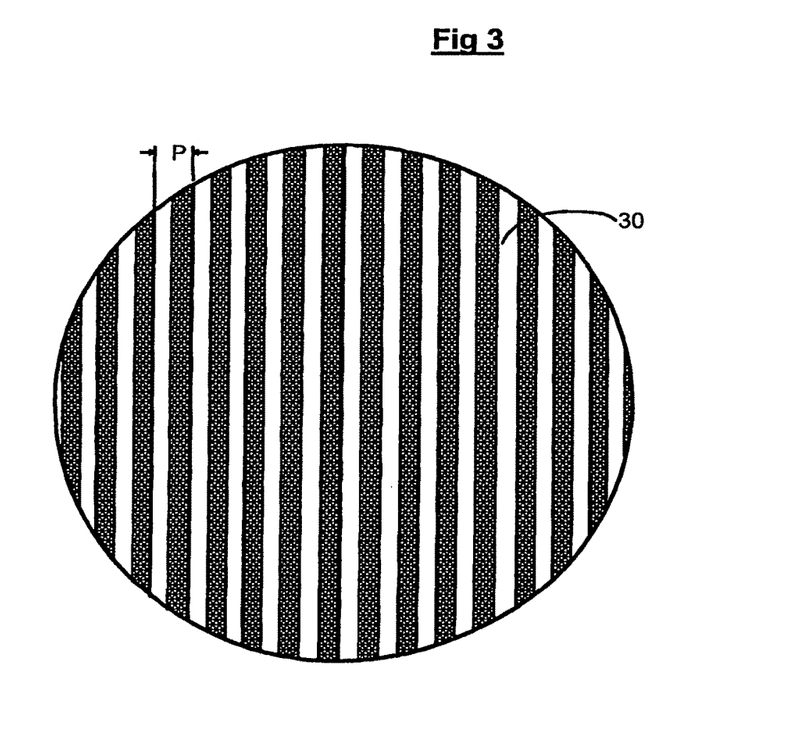
FIG. 3 shows an enlarged view through a microscope of a typical scale produced by the method of the invention.

FIG. 3 shows an enlarged view of a portion of encoder scale produced by the method of the invention. The figure shows a typical view through a microscope looking at the scale pattern produced on the substrate, having pitch P. Here the mark/space ratio is 50:50 and the pitch P is 40 µm. The pattern is obtained by firstly producing a series of marks (10 µm wide with a gap of 30 µm) and then shifting the phase of the pulses so that they occur immediately after the phase of the pulses that produced the first series of marks. Thus a second series of marks will be produced adjacent the first series but shifted by a whole spot width, 10 µm in this instance, thus producing a thicker mark made up of two adjacent 10 µm marks having a gap of 20 µm.

Figure 4:
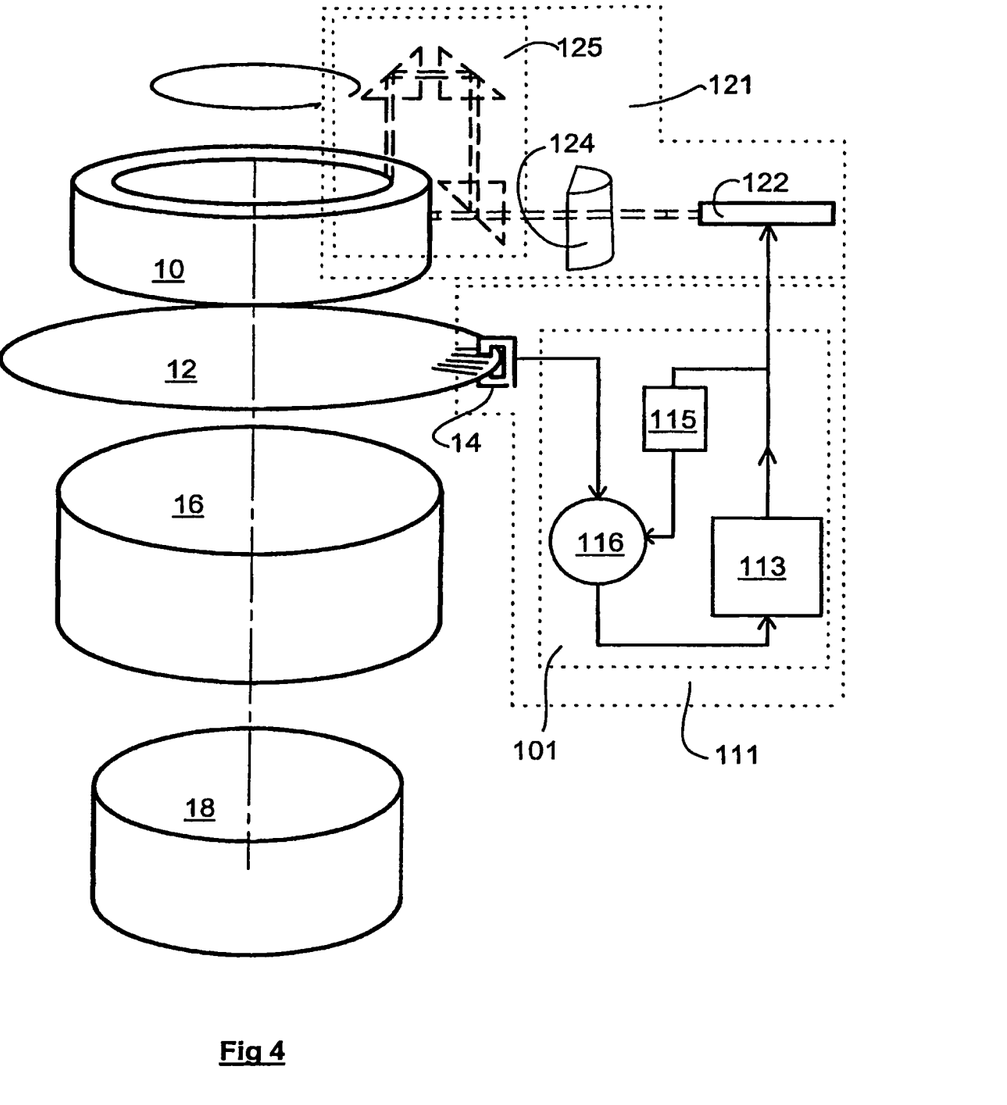
FIG. 4 shows a further apparatus utilising the invention.

FIG. 4 shows apparatus employing another embodiment of the invention. The apparatus is similar to that shown in FIG. 1 however, in this apparatus the control system 111 is different in comparison with that shown in FIG. 1. Here the phase comparator 116 of the PLL circuit 110 has inputs from the tachometer sensor 14 and a frequency divider 115 which is in turn connected to the laser drive input. A voltage controlled oscillator (vco) 113 is connected to the output of the comparator. The signal from the vco acts as a reference signal for control purposes. The voltage input of the vco is provided by the PLL. The PLL output voltage varies according to the correctness of the phase matching of its inputs from the tachometer sensor 14 and the divider 115. So, the PLL attempts to bring the divider signal phase into conformity with the phase of the tachometer signal by varying the supply voltage to the vco. In this way the laser firing rate can be dependent on the speed of the tachometer ring 12 and hence the speed of the ring 10. No motor control is used in this embodiment. The rate of laser treatment is directly proportional to the rotational velocity of the ring 10 so it does not matter at what speed the ring travels. Indeed, it would even be possible to omit the motor 18 and to drive the ring manually. It would also be possible to drive the wheel to a desired rotational speed (manually or with the motor) and then remove the drive and form the pattern while the ring free-wheels under its inertia.

Figure 5:
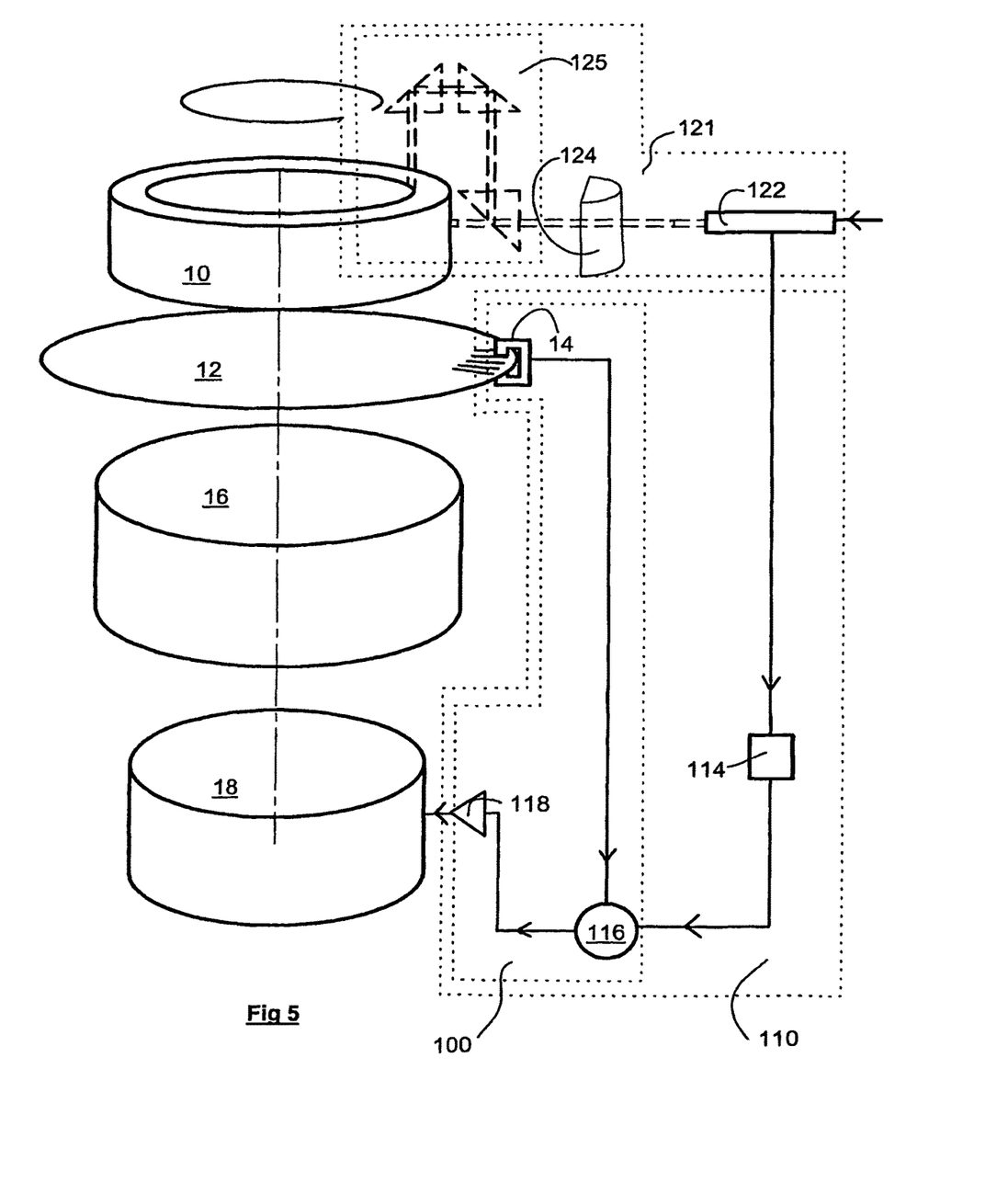
FIG. 5 shows yet further apparatus utilising the invention.

FIG. 5 shows a variation of the embodiment shown in FIG. 1.

Rather than a signal generator 112, a reference signal for supplying the PLL circuit is provided from a source internal to the laser 122. This signal will be used principally to drive the laser but is used additionally in this embodiment as a reference signal when divided or possibly multiplied.

In the embodiments described the advantages detailed below are present.

The arrangement of the control devices and the displacement devices described provides for use of an inaccurate tachometer signal and tolerance of a low resolution tachometer signal compared with the pattern to be produced on the substrate.

The use of a relatively high inertia, or low friction bearing (e.g. the air bearing described) and high values of R will keep a steady rotation of the substrate.

The use of a low bandwidth PLL circuit to drive the rotation of the substrate, together with inertial effects, overcomes any inconsistencies in the inaccurate tachometer signal.

Each pattern element can be produced by many treatment (ablation) actions and is therefore averaged. This averaging reduces errors resulting from momentary perturbations ("jitter").

Use of a progressive technique to build-up a pattern with an "S" successive spacing reduces any errors caused by perturbations or cyclic errors.

Figure 6:
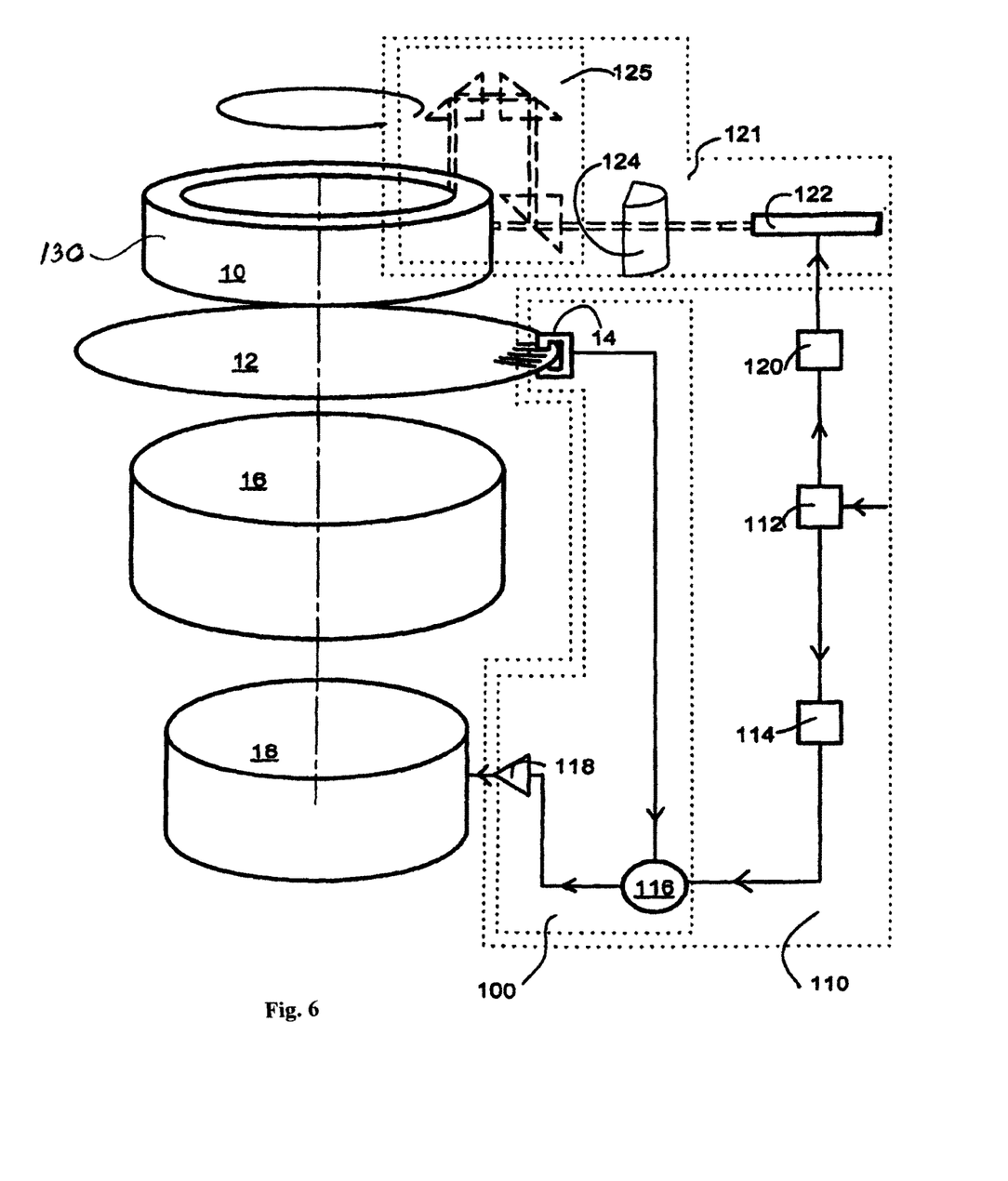
FIG. 6 shows yet further apparatus utilising the invention.

The embodiments in the invention shown are merely illustrative and many variants are envisaged. The substrates mentioned would in practice be stainless steel, and thus non-transparent and reflective, but any material could be used. The invention is not limited to laser light ablation or vaporisation, but extends to the treatment of any substrate e.g.:

the removal of an etch-resistant film 130 (see FIG. 6) on a substrate, laser deposition of material onto the surface;

spraying the surface with e.g. ink, etch resist or a suitable chemical reagent;

exposing a photographic film;

laser marking bright lines onto a surface that has previously been darkened by etching, anodising or other suitable process;

producing a depressed line feature which is subsequently filled with a contrasting material or given a contrasting surface finish;

producing line features by mechanical means e.g. diamond scribing or painting, and;

electric discharge machining.

The features produced may generate e.g. phase or Ronchi scale. Surface or sub-surface treatment is possible e.g. the under surface degrading of a transparent material.

Additionally rotary encoder scale production has been shown whereas the invention has much wider application to any repeated treatment of a substrate e.g. linear scale production. With laser pulse blocking it is possible also to introduce codes into the scale which can be recognised by scale readers to determine absolute positioning of scale relative to a reader. Thus a non-periodic portion of the pattern could be incorporated into the pattern or a separate coded absolute scale produced alongside the incremental scale. Alternatively a single embedded or otherwise reference mark may be produced. The pattern may have:

equispaced and periodically occurring elements;

equispaced and periodically occurring elements having elements missing (e.g. to provide a code in the pattern);

spaced elements conforming to a regular pattern (e.g. of a chirped type i.e. bunched with a regular but not equidistant pattern);

spaced elements conforming to an regular pattern having elements missing;

randomly occurring elements; or just one or a few elements.

Additionally, the pattern generated by this technique may be as part of a larger two-dimensional scale grid pattern.

Whilst just one treatment point is shown (i.e. just one laser beam directed toward one area) it is possible to have multiple treatment points. If multiple treatment points are applied around the circumference of a rotating substrate then cyclic errors can be mitigated.

Ring 10 is shown as an annulus. However, elements to which a pattern may be provided may be any shape, and any surface may be treated. Thus the surface of parts of machines may be treated directly, the parts so treated might be flat, curved, spherical, or of any contour provided that relative motion between the substrate and the treatment device can be monitored. The pattern may be produced at an internal surface e.g. the inside of a right or conical cylinder.

Linear scale may also be graduated by this technique provided sufficient inertia is generated.

The apparatus shown employs a stationary laser treatment device and a rotating substrate. It is entirely possible that the substrate can remain stationary and the treatment device (or a part of it, e.g. a mirror) may rotate. Such a variant might be advantageous when the substrate is part of a very large and cumbersome object.

The invention extends also to scale products manufactured in accordance with the method as described herein.

The invention claimed is:

1. A method of forming an encoder scale for a measurement device, the method comprising the steps of:
   (i) taking a laser;
   (ii) taking a non-transparent substrate carrying an etch-resistant film; and
   (iii) using the laser to remove parts of the etch-resistant film, thereby forming a pattern on the substrate that defines an encoder scale.

2. The method according to claim 1, wherein the laser is a pulsed laser that generates pulses of light and the step (iii) comprises directing the pulses of light toward the substrate.

3. The method according to claim 2,
   wherein the step (iii) comprises continuously displacing the substrate relative to the laser and using the laser to generate the pulses of light at a rate that produces the pattern, and
   wherein the parts of the etch-resistant film are removed while the continuous displacement takes place.

4. The method according to claim 3, further comprising the steps of:
   generating a reference signal defining a series of intervals,
   using the laser to produce a laser pulse of the pulses of light at each interval defined by the reference signal,
   generating a displacement signal indicative of displacement between the substrate and the laser, and
   synchronizing the displacement signal with the reference signal by varying the rate at which the substrate is displaced relative to the laser.

5. The method according to claim 2, wherein the pulses of light generated by the pulsed laser have a pulse duration of a picosecond or lower.

6. The method according to claim 2, wherein the pulses of light generated by the pulsed laser have energy of approximately 0.1 to 5 mJ per pulse.

7. The method according to claim 1, further comprising the step of passing light emitted from the laser through at least one lens to produce an elliptical spot focused on the substrate.

8. The method according to claim 1, wherein the substrate comprises a ring.

9. The method according to claim 8, wherein the pattern defining the encoder scale is formed on the circumferential surface of the ring.

10. The method according to claim 1, wherein the substrate is linear.

11. The method according to claim 1, wherein the pattern defined in step (iii) provides at least one of an absolute scale, an incremental scale and a reference mark.

12. The method according to claim 1, further comprising the step (iv) of etching the substrate through the parts of the etch-resistant film that have been removed by the laser in the step (iii).

13. The method according to claim 12, wherein the step (iv) comprises applying a chemical reagent to etch the substrate through the parts of the etch-resistant film removed by the laser.

14. The method according to claim 12, further comprising the step of removing the etch-resistant film.

15. The method according to claim 1, wherein the etch-resistant film is an etch resist.

16. The method according to claim 1, wherein the substrate is a metal substrate.

17. The method according to claim 16, wherein the substrate is a stainless steel substrate.

18. A method of forming an encoder scale for a measurement device, the method comprising the following steps in any suitable order:
   providing a substrate;
   providing a substrate treatment device;
   providing a control system;
   providing a displacement mechanism that provides a displacement signal indicative of displacement;
   operating the displacement mechanism to cause continuous relative displacement between the substrate and the substrate treatment device; and
   operating the control system to monitor the displacement signal and cause the substrate treatment device to treat the substrate at intervals so as to produce a pattern while the continuous displacement takes place, the control system being further operated to perform a timing comparison step to synchronize the displacement signal and the intervals,
   wherein the substrate comprises a surface that has previously been darkened by treating the surface directly by at least one of etching and anodizing, and
   wherein the substrate treatment device comprises a laser that marks bright lines directly onto the surface of the substrate.

19. A method of forming an encoder scale for a measurement device, the method comprising the steps of:
   (i) taking a laser;
   (ii) taking a non-transparent substrate carrying an etch resist; and
   (iii) using the laser to remove parts of the etch resist, thereby forming a pattern on the substrate that defines an encoder scale.

20. A method of forming an encoder scale for a measurement device, the method comprising the following steps in any suitable order:
   providing a substrate;
   providing a substrate treatment device;

providing a control system;
providing a displacement mechanism that provides a displacement signal indicative of displacement;
operating the displacement mechanism to cause continuous relative displacement between the substrate and the substrate treatment device; and
operating the control system to monitor the displacement signal and cause the substrate treatment device to treat the substrate at intervals so as to produce a pattern while the continuous displacement takes place,
wherein the control system is further operated to perform a timing comparison step of synchronizing the displacement signal and the intervals,
wherein the substrate comprises an etch-resistant film, and
wherein the substrate treatment device comprises a laser that removes at least part of the etch-resistant film.

* * * * *